March 18, 1952 P. L. REED 2,589,961
METHOD FOR MAKING ELECTRODE ASSEMBLIES
Filed May 17, 1951 5 Sheets-Sheet 1

INVENTOR.
PRICE L. REED
BY
ATTORNEYS.

March 18, 1952 P. L. REED 2,589,961
METHOD FOR MAKING ELECTRODE ASSEMBLIES
Filed May 17, 1951 5 Sheets-Sheet 2

INVENTOR.
PRICE L. REED
BY
ATTORNEYS.

INVENTOR.
PRICE L. REED

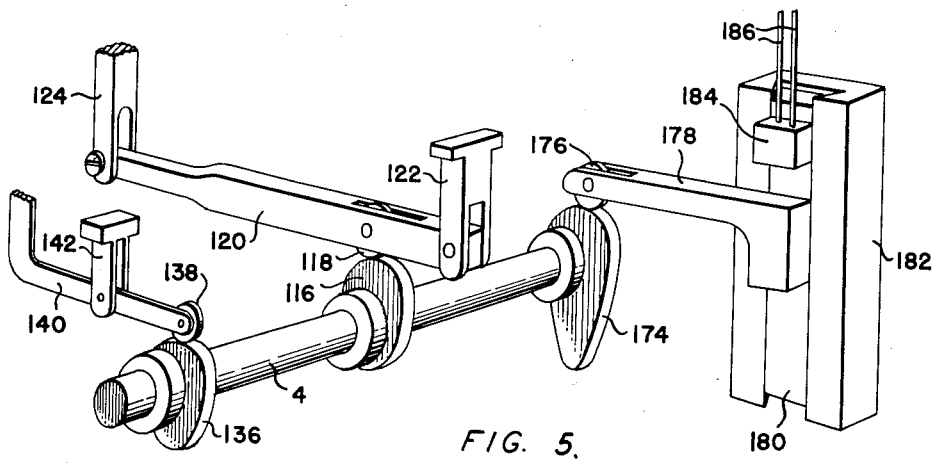
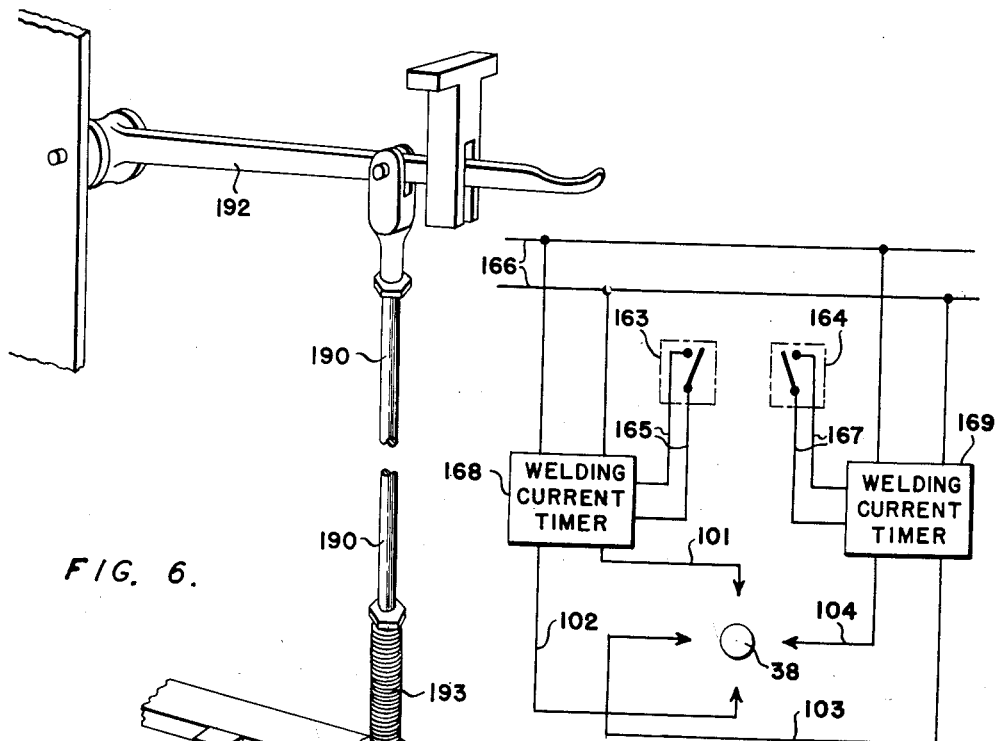

March 18, 1952 P. L. REED 2,589,961
METHOD FOR MAKING ELECTRODE ASSEMBLIES
Filed May 17, 1951 5 Sheets-Sheet 5

INVENTOR.
PRICE L. REED
BY
ATTORNEYS.

Patented Mar. 18, 1952

2,589,961

UNITED STATES PATENT OFFICE 2,589,961

METHOD FOR MAKING ELECTRODE ASSEMBLIES

Price L. Reed, Royersford, Pa., assignor to Superior Tube Company, Philadelphia, Pa., a corporation of Pennsylvania Application May 17, 1951, Serial No. 226,856

6 Claims. (Cl. 219—4)

This invention relates to the manufacture of cathodes for thermionic tubes and has particular reference to the disc-type of cathode which is used in various cathode ray tubes, television pick-up tubes and tubes of the so-called lighthouse construction.

In tubes of the above mentioned type, the thermionic emission is obtained from a relatively small, cup-shaped disc coated with alkaline earth oxides. The disc must be rigidly mounted within the tube a few thousandths of an inch from a grid member and in accurate parallel alignment therewith. The disc is supported by a metal tubular member which may be of any conventional form, i. e., seamless or of lock seam, welded, welded and drawn, boxed, or wrap-around ribbon type, and also serves as a means of conducting heat to the disc or cup carrying the oxides to heat it to electron-emitting temperature. An insulated tungsten, molybdenum or similar wire is usually placed within the tube to provide sufficient heat by electrical resistance to make possible attainment of the proper temperature.

In order to support the cathode assembly, ceramic or similar heat-resistant insulators are employed. These insulators, generally in the form of a flat disc, are mounted on the tubular member prior to the attachment of the cup to the tubular member. The attachment of the cup to the tubular member is generally accomplished by inserting the tubular member into the cup which fits as a snug cap over the end of the tube and then welding the cap to the tube.

In my Patent No. 2,476,454, issued July 19, 1949, there is disclosed a machine for making the cathode assembly which welds the cap to the tube one weld at a time and rotates the assembly to successive welding positions under a single welding electrode.

It is an object of this invention to maintain an accurate dimension longitudinally between the face of the disc and the face of the cap while welding the cap to the tube supporting the disc.

Another object of this invention is to maintain accurate parallel plane alignment between the face of the disc and the end face of the cup while welding the cup to the tube supporting the disc.

It is a further object of this invention to provide means for automatically positioning successive electrode assemblies in a predetermined position, engaging the electrode assemblies with welding apparatus to weld the cap to the tube, and carrying the electrode assembly away from the welding apparatus, and for accomplishing these operations at a high rate of speed.

These and other objects of the invention will become apparent from the following description when read in conjunction with the accompanying drawings, in which:

Figures 5 and 6 are perspective views of fragmentary portions of the apparatus.

Figure 9 is a diagram of the electrical circuit involved.

Figures 1, 4:
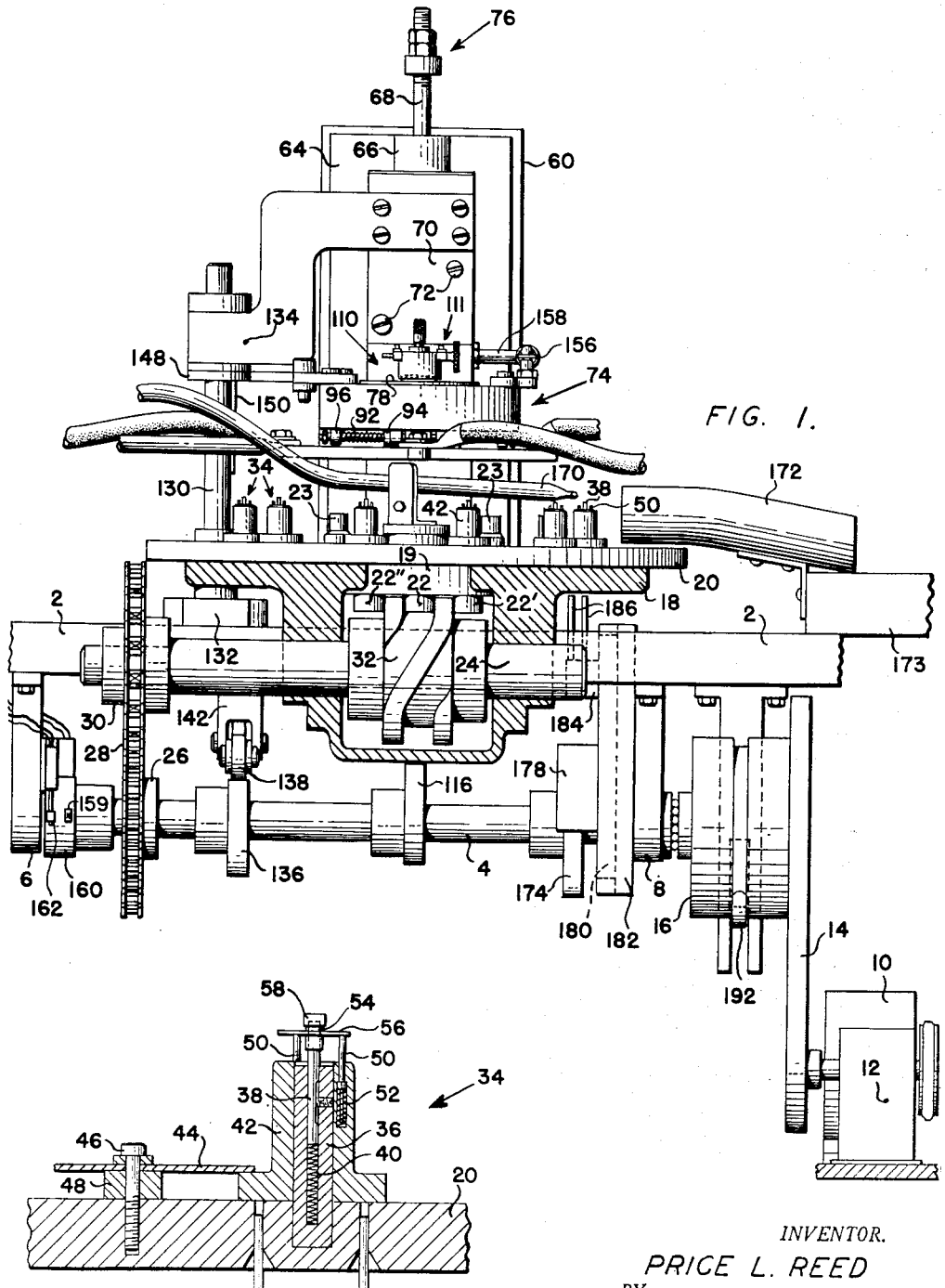
Figure 1 is a front elevation, partly in section, showing the apparatus forming this invention.
Figure 4 shows, in section, an elevation of a fragmentary portion of the apparatus.

Referring to the figures there is shown a plate 2 on which the apparatus is mounted. The cam shaft 4 is rotatably mounted below the mounting plate 2 in the bearings 6 and 8 which are suspended from the mounting plate 2. The driving motor 10 is coupled through a suitable speed reducer 12 and drive belt 14 to drive the cam shaft 4 through the clutch assembly 16.

Affixed to the mounting plate 2 is the housing 18. The rotatable worktable 20 is attached to the rotatable disc 19 by means of the bolts 23. The center pin 21 is mounted in the housing 18 and rotatably mounts the disc 19 and worktable 20 which are held in position thereon by means of the washer 25 and bolt 27. Affixed to the underside of the rotatable disc 19 are a plurality of studs 22 disposed in a circular array.

The shaft 24 is rotatably mounted in the housing 18 and is driven by the cam shaft 4 through the sprocket 26, the chain 28 and the sprocket 30. The driving worm 32 is mounted on the shaft 24, rotates therewith as the shaft is driven and is positioned to engage the studs 22. As will be apparent from viewing Figure 1, the formation of the worm 32 is such that, as the worm rotates upwardly on the side toward the viewer, a stud in the position of the stud 22' will enter the right hand side of the worm as viewed in the figure, move to a position central in the worm as occupied by the stud 22 and remain in that position for approximately one-half a revolution of the shaft 24, and thereafter be moved outwardly to the left to the position occupied by the stud 22'.

Thus there is provided an intermittently rotating motion of the mounting plate 20 as the shaft 24 rotates continuously.

Cathode mounting assemblies, shown generally at 34, are positioned in a circular array on top of the rotating worktable 20. One of these mounting assemblies is shown in detail in Figure 4. Each of the assemblies includes a stud member 36 which is rigidly mounted in the rotating worktable 20. Slidably mounted within the stud 36 is the pin 38 which is urged upwardly by the spring 40. The sleeve member 42 is slidably mounted externally of the pin 36 and is held down against the worktable 20 by means of the leaf spring 44, the leaf spring being mounted on the table 20 by means of the bolt 46 and the block 48. Mounted in the sleeve member 42 are three pins 50 each of which are urged upwardly by a spring 52. Each of the cathode mounting assemblies are adapted to support a cathode as is shown in Figure 4 which includes a tubular portion 54 which is mounted in a ceramic disc 56 and has positioned over one end thereof a cap 58 which is to be welded to the tube. As the worktable is rotated, cathodes assembled with unwelded caps will be placed upon each of the cathode mounting assemblies as they pass a given point.

Also mounted on the mounting plate 21 is the vertically positioned plate 60. Slidably mounted within the mounting plate 60 is the gib plate 62. Mounted on the face of the mounting plate 60 is the cover plate 64 which is provided with the extended portion 66 which contains a bore for the passage of the stud 68. The member 70 is bolted to the sliding gib plate 62 by means of the bolts 72. The member 70 has a forwardly extended lower portion 73 to which is mounted the welding head assembly shown generally at 74 and shown in detail in Figures 7 and 8. The stud 68 passes freely through the member 66 and is threaded into the member 70. The washer and jam nut assembly, shown generally at 76, are threaded onto the upper end of the stud 68 and are adapted to engage the member 70 and provide a low limit stop for the downward travel of the welding head.

The welding head is substantially the same as that disclosed in my Patent No. 2,559,547, issued July 3, 1951. The welding head includes a circular mounting plate 78 which supports the disc member 80 in which there are provided four radial slots slidably mounting the electrode mounting blocks 82. Rotatably mounted on the disc member 80 is the ring or collar member 84, and attached inside of the rim of the collar are the four cam members 86. The cam members 86, which move with the collar 84 as it is rotated, are adapted to engage the outer portions of the electrode mounting members 82 and move the members 82 radially inwardly against the urging of the springs 88.

Inward movement of the electrode mounting blocks 82 carries the welding electrodes 90 inwardly and into engagement with the cap 58 of a cathode assembly to be welded which has been positioned on a cathode mounting assembly 34. After the welding electrodes 90 engage the cathode cap 58, further travel of the electrode mounting members 82 is taken up by compression of the springs 92 which are mounted between collars 94 rigidly affixed to the welding electrode assembly and the yoke members 96 in which the welding electrode assemblies are adapted to slide. The yoke members 96 are insulated from the electrode mounting blocks 82 by the layer of insulation, shown at 83, and are connected to welding current control means, as will be hereinafter described, through the conductors 101, 102, 103 and 104.

Figures 7, 8:
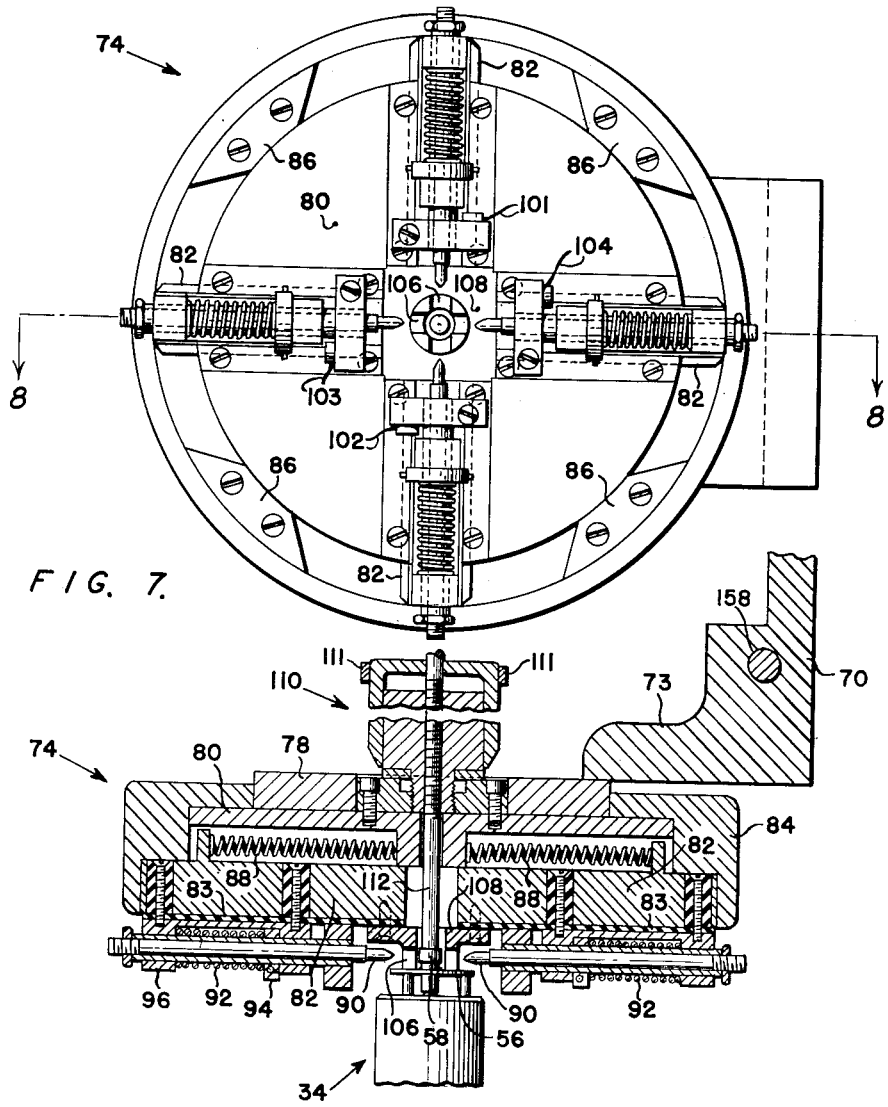
Figure 7 is a view of the underside of the welding apparatus shown in Figures 1–3.
Figure 8 is a vertical section through the welding apparatus taken on the trace 8—8 shown in Figure 7.

The welding head assembly, as shown in Figure 8, is in a downward position as will be hereinafter described. In this position, the fingers 106 of the gauge plate 108 contact the upper surface of the disc 56 of the cathode assembly and press the disc downwardly against the studs 50 which are free to move downwardly, as previously described, against the compression of the springs 52. A conventional micrometer assembly, shown generally at 110, is mounted on the plate 78 and extending through a bore in the plate is the micrometer stem 112. It will be apparent that, by adjustment of the micrometer, the relative positions of the face of the lower end of the stem 112 and the lower surfaces of the gauge fingers 106 may be accurately established and that the lower face of the micrometer stem 112, when engaging the cathode cap 58, will press downwardly against the compression of the spring 40 the rod member 38 which supports the cathode sleeve.

Thus the pins 50 and their supporting springs press the cathode disc upwardly against the gauge fingers 106 and the center stem 38 and its urging spring presses the cathode cap member 58 upwardly against the micrometer stem 112. The gauging apparatus thereby serves to provide both accurate parallel plane alignment between the plane of the surface of the cathode cap and the plane of the surface of the ceramic disc, as well as maintaining an accurate longitudinal dimension between the face of the disc and the face of the cap. As shown in the figures, there is provided a clamping mechanism 111 to prevent the micrometer from rotating and to hold the micrometer in a predetermined position of adjustment.

Rotation of the cam shaft 4 will cause rotation of the worm 32 and the worktable 20 as previously described. The cathode mounting assemblies are located on the worktable 20 so as to be successively positioned immediately below the welding head assembly when the worktable is at periods of rest between intermittent motions. The cam 116 is rigidly affixed to the cam shaft 4 and is adapted to engage the follower 118 which is mounted in the lever 120 and to move the lever 120 upwardly by pivotal motion with respect to the yoke 122, the yoke 122 being affixed to the underside of the mounting plate 2. The lever 120, when raised by the cam 116, moves the connecting link 124 upwardly. The upper end of the link 124 is connected to the outwardly extending member 126 which is rigidly affixed to the gib member 62 and passes through a suitable slot in the stationary gib mounting plate 60. Thus, as the rise of the cam 116 engages the follower 118, the gib 62 and the welding head which is mounted thereon are carried upwardly.

The spring 128 is connected between the member 126 and the mounting plate 2, and is provided to move the gib 62 downwardly when the cam 116 passes from below the cam follower 118. The downward movement of the gib 62 in response to the urging of the spring 128 is limited by the stop assembly 76 which is mounted on the upper end of the stud 68 when the stop assembly engages the top of the portion 66 of the stationary member 64 as previously described.

The vertical rod 130 is rotatably mounted in the base member 132 which is affixed to the mounting plate 2. Slidably mounted on the rod 130 is the guide plate 134 which is bolted to the member 70 and moves upwardly and downwardly therewith. The member 134 serves to support the upper end of the rod 130.

Figure 2:
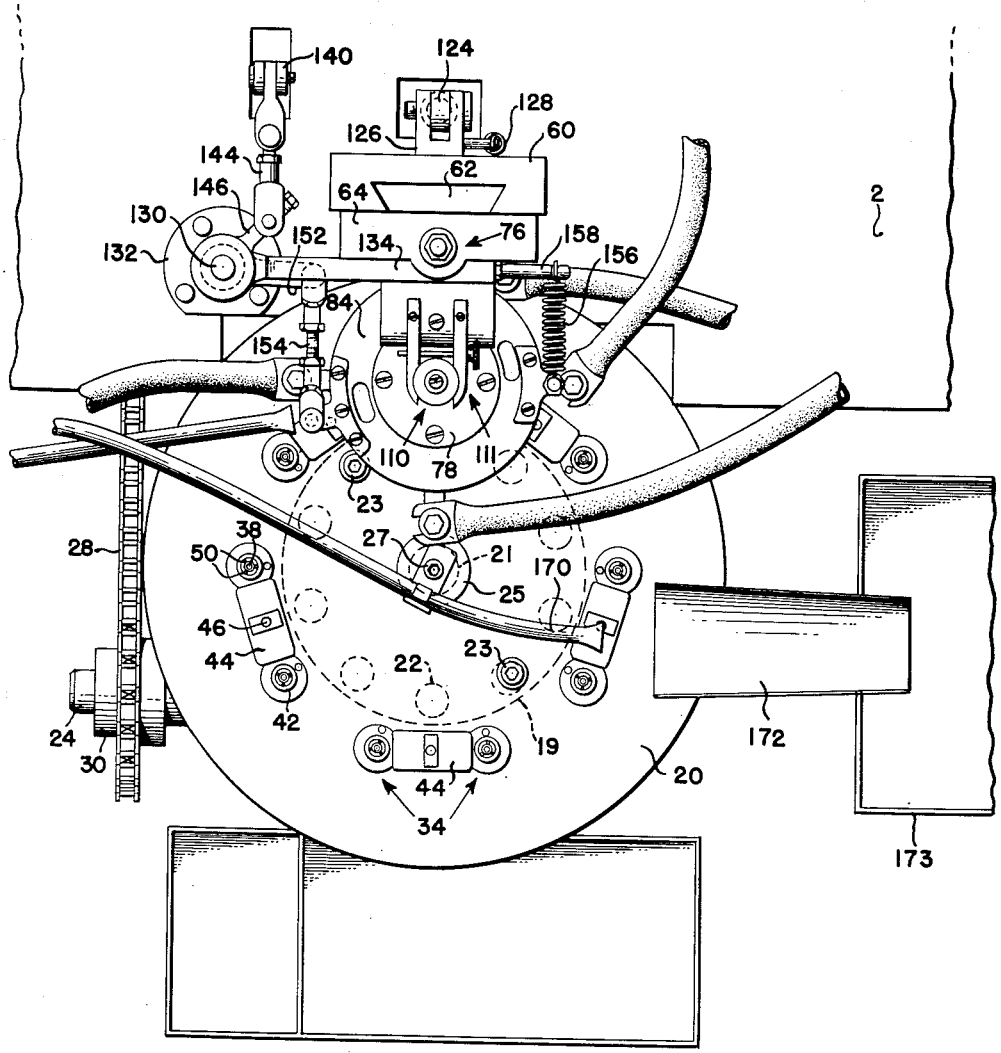
Figure 2 is a plan view of the apparatus shown in Figure 1.
Figure 3:
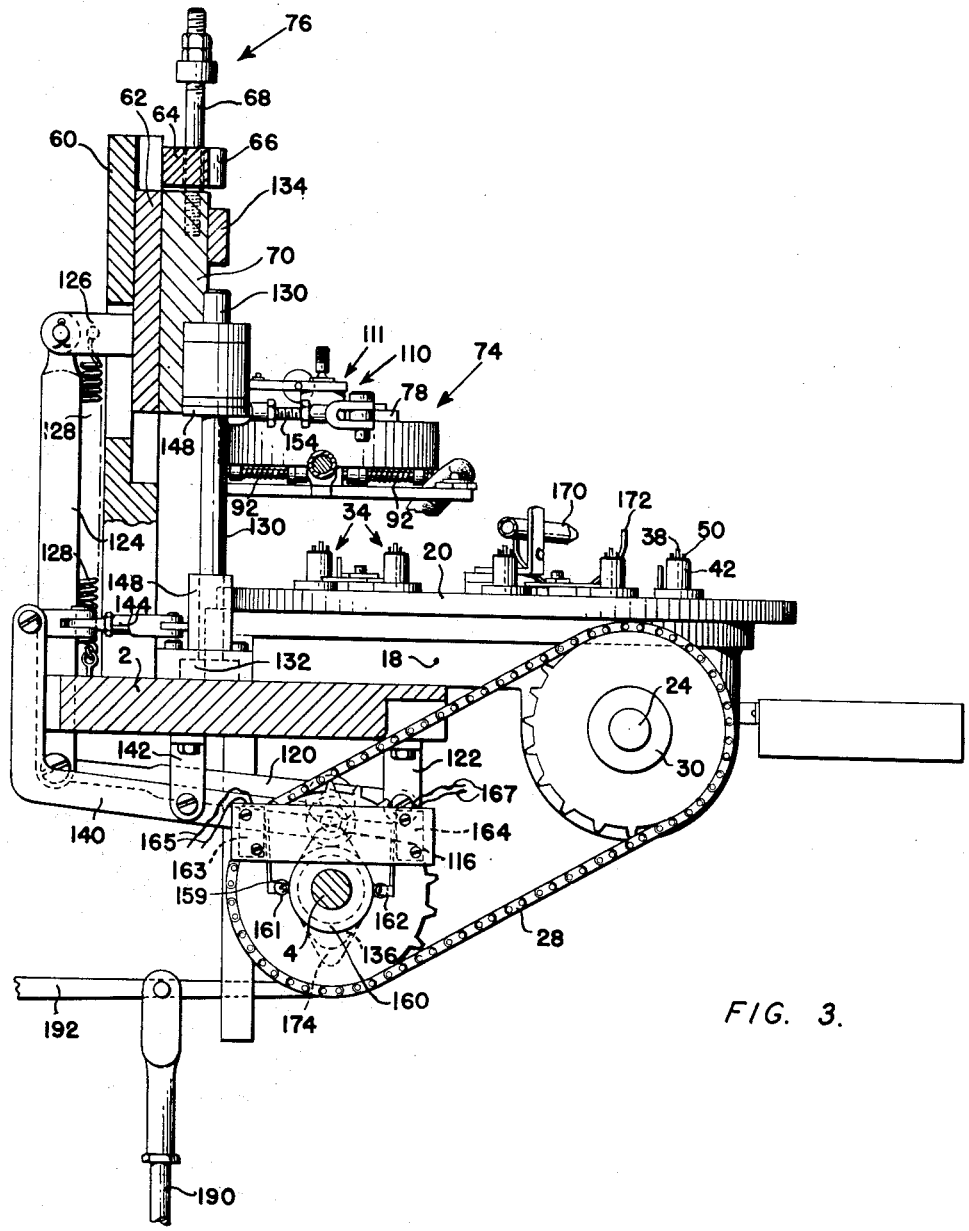
Figure 3 is an elevation, partly in section, viewing the apparatus from the left hand side of Figure 1.

The cam 136 is mounted on the cam shaft 4 and acts against the cam follower 138 which is mounted in one end of the lever arm 140. The lever arm 140 is pivotally mounted in the yoke member 142 which is supported from the underside of the mounting plate 2. The opposite end of the lever arm extends upwardly through the mounting plate 2 and is connected through the adjustable link member 144 to the extended portion 146 of the sleeve 148 which is rigidly affixed to the rotatable rod 130. Thus, when the rise of the cam 136 engages the cam follower 138, the lever arm 140 is actuated to pull the linkage 144 and to rotate the member 146 and the rod 130 in a counterclockwise direction as viewed in Figure 2. The collar 148 is slidably mounted on the rod 130 but is engaged by the key 150 and thus is rotated when the rod 130 rotates. Affixed to the collar 148 is the outwardly extending arm 152 which is connected through the adjustable linkage 154 to the rotatable collar 84 of the welding head assembly.

When the rod 130 is rotated by the action of the cam 136, motion of the extended portion 152 and the linkage 154 will cause the collar 84 of the welding assembly to rotate sufficiently to bring the cams 86 into engagement with the outer end portions of the electrode mounting blocks 82 which, as previously described, causes the electrodes to engage the electrode cap.

The cams 116 and 136 are positioned on the cam shaft 4 and have respective periods of dwell such that the electrode assembly is first moved downwardly by the action of the cam 116 and the spring 128 as previously described. Then, with the welding head in a downward position, the cam 136 operates to bring the welding electrodes into position against the cathode cap. After a welding current is passed through the electrodes and the cathode cap, as will be hereinafter described, continued rotation of the cam shaft 4 moves the rise of the cam 136 out from under the follower 138 and the spring 156 which is connected between the collar 84 of the welding head, and the arm 158 extending from the member 70 draws the collar 84 back to a position in which the cams 86 no longer engage the ends of the electrode mounting blocks 82.

The collar 160 mounted on the cam shaft 4 carries a pair of projections 159. The followers 161 and 162 are each positioned to engage one of the projections 159 and, upon engagement therewith, to actuate the limit switches 163 and 164, respectively, which serve to initiate the welding timers through the circuit as shown in Figure 9.

Figure 9 shows the electrical welding circuit involved which includes the power lines 166 which are connected to a suitable power source and to which are connected the welding timers 168 and 169. Connected to the welding timer 168 are the conductors 101 and 102, and connected to the welding timer 169 are the conductors 103 and 104. These conductors lead to the welding electrodes as shown in Figure 7. It should be noted that the rod 38 on which the cathode is mounted is preferably made of brass or other suitably conductive material so that the welding current may pass, for example, from conductor 101, through the tube and cap to be welded, through the rod 38, and then through the other side of the tube and cap to the conductor 102. The limit switch 164 is adapted to initiate the welding timer 168 and the limit switch 163 is adapted to initiate the welding timer 169. The welding timer initiating projections 159 are positioned on the cam shaft so that the welding timers are initiated at the proper movement when the collar 84 of the welding head is in a rotated position and the welding electrodes are in engagement with a cathode cap.

As the successive cathode caps are welded and are carried away from the welding position by rotation of the work-table 20, they will be carried to a position adjacent the air jet tube 170 and the discharge chute 172.

The cam 174 mounted on the cam shaft 4 is engaged by the cam follower 176 which is mounted in the arm 178. The arm 178 is affixed to the gib 180. The gib 180 is slidably mounted in the gib mounting plate 182 which is affixed to the mounting plate 2. The block 184 which is mounted on the gib 180 carries the pair of the upwardly extending rod members 186. The upwardly extending rods 186 are adapted to pass through bores in the rotating worktable 20, and engage the lower surface of the member 42 and raise the member 42 against the urging of the leaf spring 44, thereby raising the cathode assembly upwardly clear of the end of the rod 38. The cathode assembly when thus cleared from the end of the rod 38 and engaged by the jet of air emerging from the tube 170 is carried thereby into the chute 172 and is deposited into the receptacle 173. Thus, as each cathode mounting assembly comes to rest in a position adjacent to the end of the air jet tube 170, operation of the cam 174 and of the rods 186 will raise the cathode clear of the cathode mounting assembly and permit the cathode to be ejected from the worktable. The empty cathode mounting assembly then rotates with the intermittently rotating worktable to the position where it is loaded with an unwelded cathode assembly.

If during operation of the machine it should become necessary for the operator to arrest the intermittently rotating operation of the worktable, the operator may, by depressing the treadle lever 188, move the vertical rod 190 and the clutch operating lever 192 downwardly to effect disengagement of the clutch 16. When it is desired to reestablish the intermittent rotation of the worktable, the treadle 188 may be released and the rod 190 and the operating lever 192 will be carried upwardly by the urging of the spring 193 and the clutch will be thereby reengaged.

It will be apparent that the apparatus disclosed herein provides for the rapid and economical attachment of the caps to cathode assemblies. The apparatus further provides for the utilization of the welding apparatus disclosed in my above mentioned copending patent application to the fullest degree. It will be apparent that various modifications may be made in the embodiment of the invention as disclosed herein without departing from the scope of the invention as set forth in the following claims.

What is claimed is:

1. Apparatus for welding cathode assemblies each including a tube, an element mounted on the tube and a member to be welded to the tube, said apparatus comprising a rotatable platform, a plurality of cathode assembly mounting means mounted on the platform, the mounting means each including an elongated support on which the tube and element mounted thereon and said member may be mounted, means mounting welding electrodes movable transversely to the axis of said support, gauging means for engaging the element and the member to fix their axial relationship, means for intermittently rotating the platform to bring the cathode assembly mounting means to rest successively adjacent to the welding electrode mounting means, means for moving the gauging means and the welding electrodes into engagement with a cathode assembly positioned on the adjacent cathode assembly supporting means, and means for passing welding current through the electrodes and the cathode assembly engaged thereby to effect welding of the cathode assembly member to the tube in proper axial relationship as established by the gauging means.

2. Apparatus for welding cathode assemblies each including a tube, an element mounted on the tube and a member to be welded to the tube, said apparatus comprising a rotatable platform, a plurality of cathode assembly mounting means mounted on the platform, the mounting means each including an elongated support on which a cathode assembly tube and member may be mounted and means yieldingly urging the support upwardly, means mounting welding electrodes movable transversely to the axis of said support and mounting gauging means for engaging an element and a member to fix their axial relationship, means for intermittently rotating the platform to bring the cathode assembly mounting means to rest successively adjacent to the welding electrode mounting means, means for moving the gauging means and the welding electrodes into engagement with a cathode assembly positioned on the adjacent cathode assembly supporting means, the cathode assembly member being urged into engagement with the gauging means by the support, and means for passing welding current through the electrodes and the cathode assembly engaged thereby to effect welding of the cathode assembly member to the tube in proper axial relationship as established by the gauging means.

3. Apparatus for welding cathode assemblies each including a tube, an element mounted on the tube and a member to be welded to the tube, said apparatus comprising a rotatable platform, a plurality of cathode assembly mounting means mounted on the platform, the mounting means each including an elongated support on which a cathode assembly tube and member may be mounted and means yieldingly urging the support and the cathode assembly element upwardly, means mounting welding electrodes movable transversely to the axis of said support and mounting gauging means for engaging an element and a member to fix their axial relationship, means for intermittently rotating the platform to bring the cathode assembly mounting means to rest successively adjacent to the welding electrode mounting means, means for moving the means mounting the welding electrodes and the gauging means into a position of predetermined relation with the adjacent cathode assembly supporting means when the platform is at rest in which position the cathode assembly mounted thereon is urged into engagement with the gauging means by the mounting means, means for moving the welding electrodes into engagement with the cathode assembly, and means for passing welding current through the electrodes and the cathode assembly engaged thereby to effect welding of the cathode assembly member to the tube in proper axial relationship as established by the gauging means.

4. Apparatus for welding cathode assemblies each including a tube, an element mounted on the tube and a member to be welded to the tube, said apparatus comprising a rotatable platform, a plurality of cathode assembly mounting means mounted on the platform, the mounting means each including an elongated support on which a cathode assembly tube and member may be mounted, yielding means urging the support upwardly, yielding means for engaging and urging a cathode assembly element upwardly, means mounting welding electrodes movable transversely to the axis of said support and mounting gauging means for engaging cathode assemblies, the gauging means including a fixed gauge member, and an adjustable gauge member, said gauge members having parallel surfaces, one of the surfaces being engageable with a cathode assembly element and the other being engageable with a cathode assembly member to fix their axial relationship, means for intermittently rotating the platform to bring the cathode assembly mounting means to rest successively adjacent to the welding electrode mounting means, means for moving the means mounting the welding electrodes and the gauging means into a position of predetermined relation with the adjacent cathode assembly mounting means when the platform is at rest in which the cathode assembly element and member mounted thereon are urged into engagement with the gauging means by the elongated support, means for moving the welding electrodes into engagement with the cathode assembly, and means for passing welding current through the electrodes and the cathode assembly engaged thereby to effect welding of the cathode assembly member to the tube in proper axial relationship as established by the gauging means.

5. Apparatus for welding cathode assemblies each including a tube, an element mounted on the tube and a member to be welded to the tube, said apparatus comprising a rotatable platform, a plurality of cathode assembly mounting means mounted on the platform, the mounting means each including an inner member having an elongated member yieldingly mounted therein for engaging a cathode assembly tube and member and an outer member mounting yielding means for engaging a cathode assembly element, means mounting movable welding electrodes, means for intermittently rotating the platform bringing the cathode assembly mounting means to rest successively adjacent to the welding electrode mounting means, means for moving the welding electrodes into engagement with a cathode assembly positioned on the adjacent cathode assembly supporting means when the platform is at rest, means for passing welding current through the electrodes and the cathode assembly engaged thereby to effect welding of the cathode assembly tube and member, and means spaced from the welding electrode mounting means acting on successive cathode assembly mounting means to displace the outer member of the mounting means and to disengage the cathode assembly from the elongated member mounted in the inner member of the mounting means.

6. Apparatus for welding cathode assemblies each including a tube, an element mounted on the tube and a member to be welded to the tube, said apparatus comprising a rotatable platform, a plurality of cathode assembly mounting means mounted on the platform, the mounting means each including an inner member having an elongated member yieldingly mounted therein for engaging a cathode assembly tube and member and an outer member slidably mounted on the inner member and mounting yielding means for engaging a cathode assembly element, yielding means urging the outer member downwardly against the platform, means mounting movable welding electrodes, means for intermittently rotating the platform bringing the cathode assembly mounting means to rest successively adjacent to the welding electrode mounting means, means for moving the welding electrodes into engagement with a cathode assembly positioned on the adjacent cathode assembly supporting means when the platform is at rest, means for passing welding current through the electrodes and the cathode assembly engaged thereby to effect welding of the cathode assembly tube and member, and means acting upwardly through the platform and on successive cathode assembly mounting means to displace the outer member of the mounting means to disengage the cathode assembly from the elongated member mounted in the inner member of the mounting means.

PRICE L. REED.

REFERENCES CITED

The following references are of record in the file of this patent:

UNITED STATES PATENTS

| Number | Name | Date |
|---|---|---|
| 1,554,385 | Still | Sept. 27, 1925 |
| 1,635,536 | Butler | July 12, 1927 |
| 1,826,207 | Fassler | Oct. 6, 1931 |
| 2,341,133 | Weightman | Feb. 8, 1944 |
| 2,464,839 | Fairfield | Mar. 22, 1949 |
| 2,476,454 | Reed | July 19, 1949 |
| 2,558,005 | Sciaky | June 26, 1951 |